INVENTOR.
William Stern
BY Olson & Trexler
Attys.

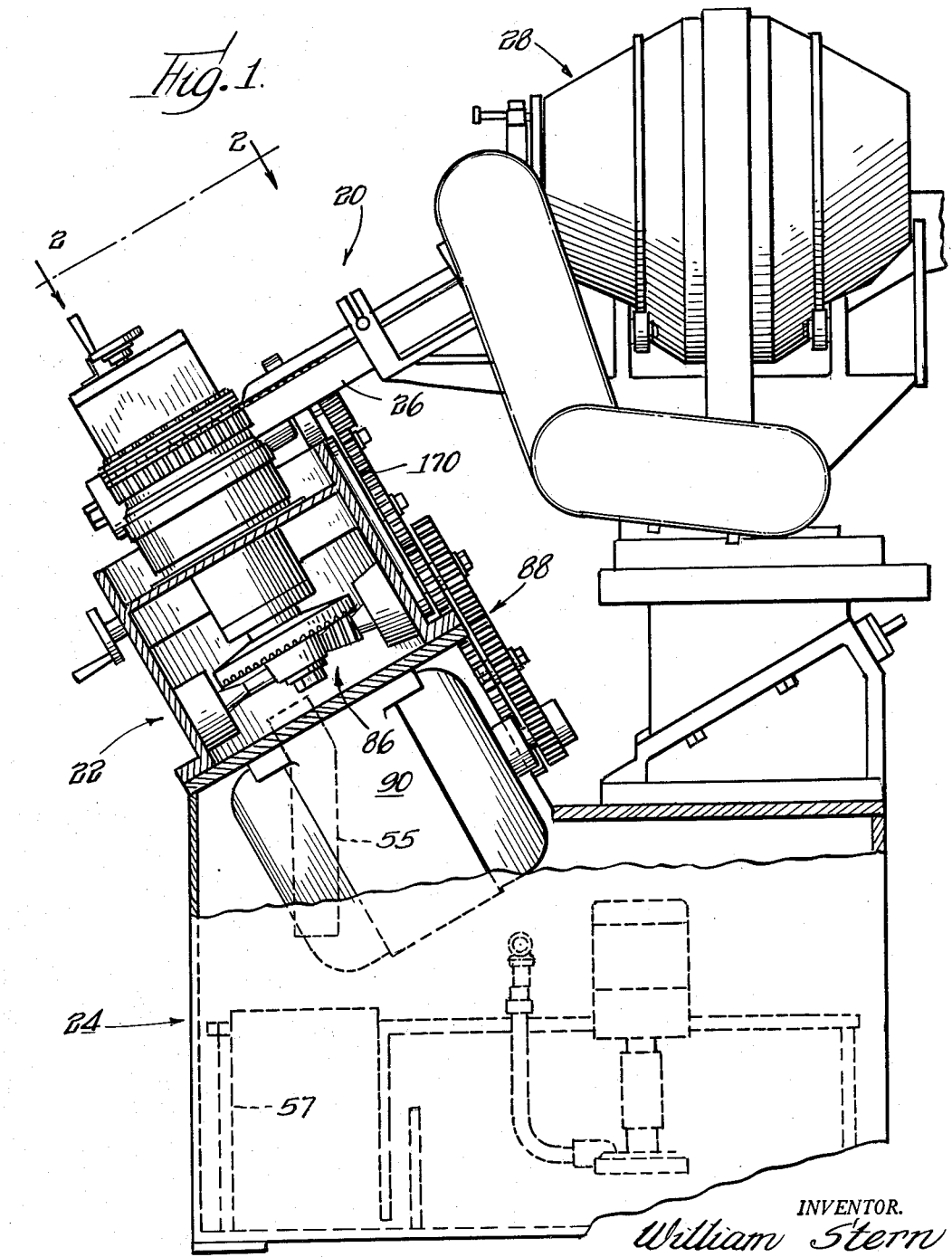

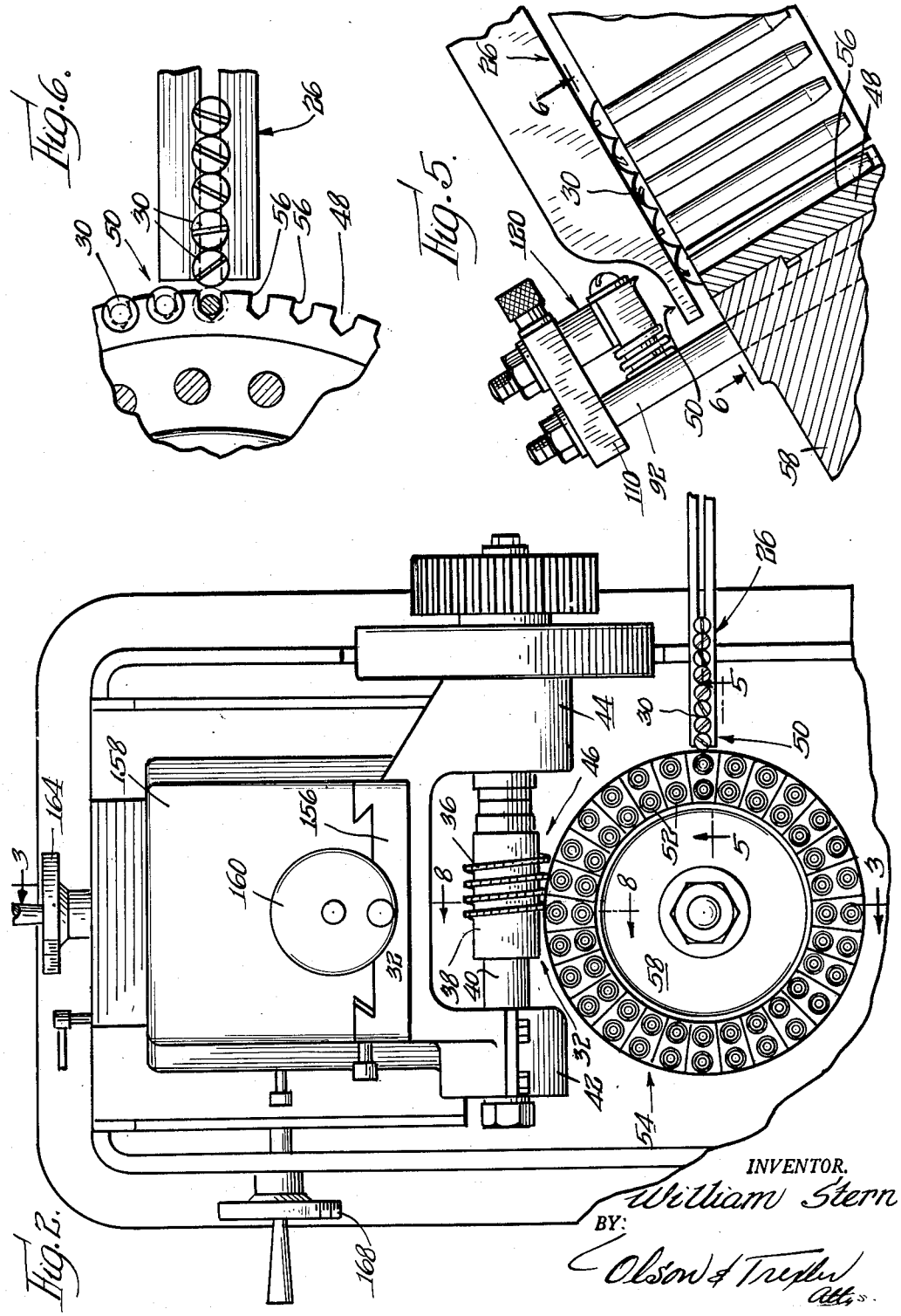

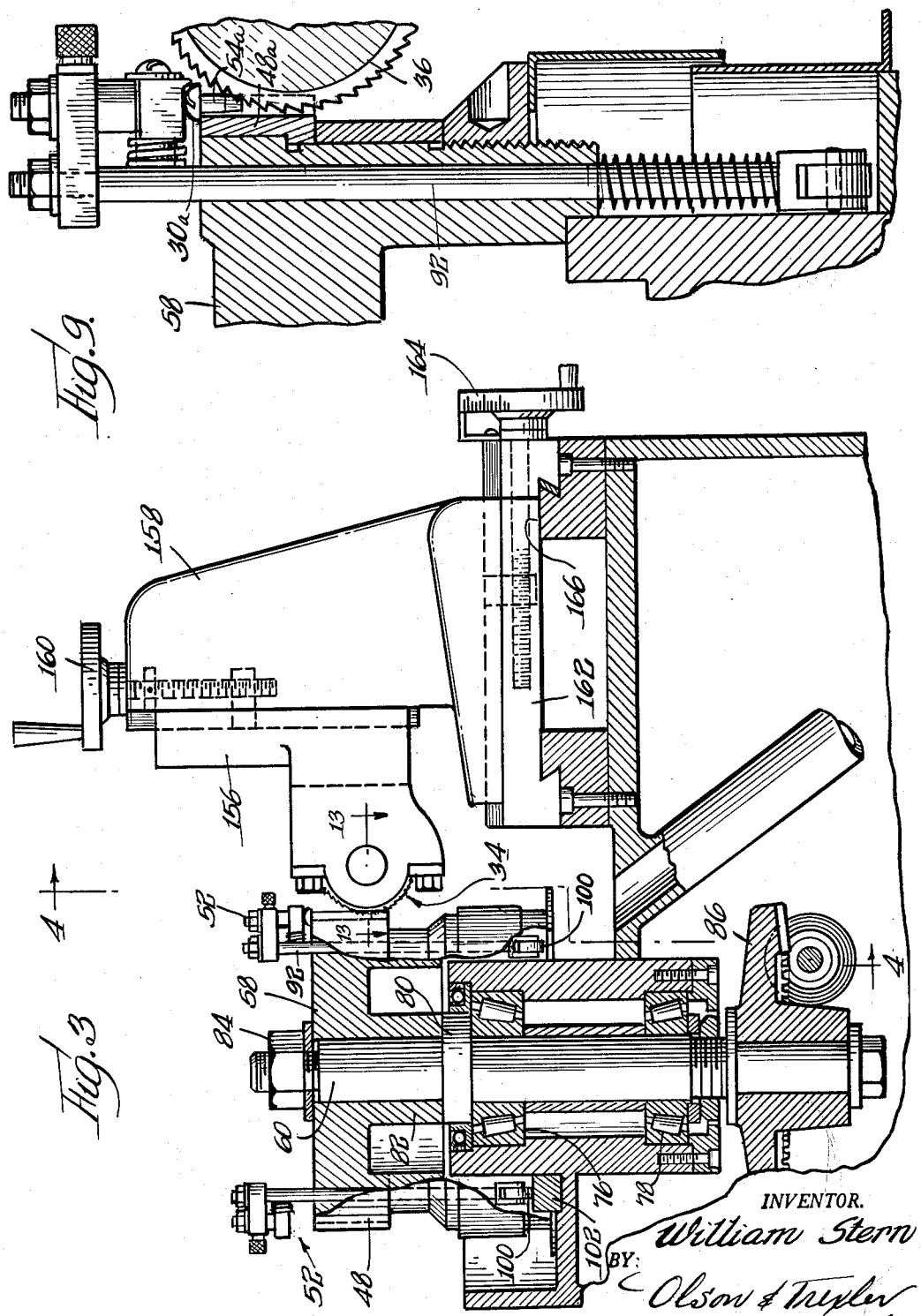

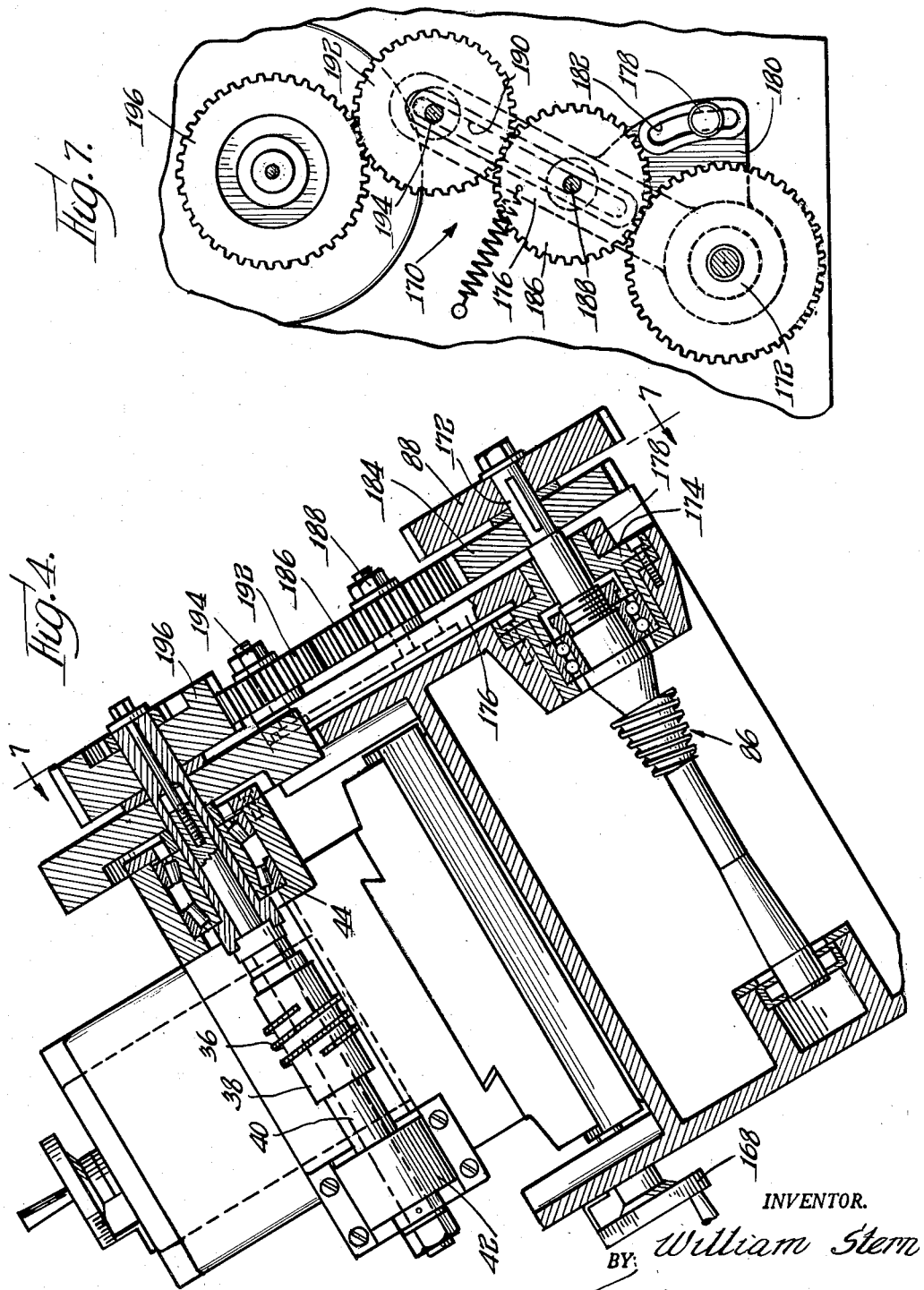

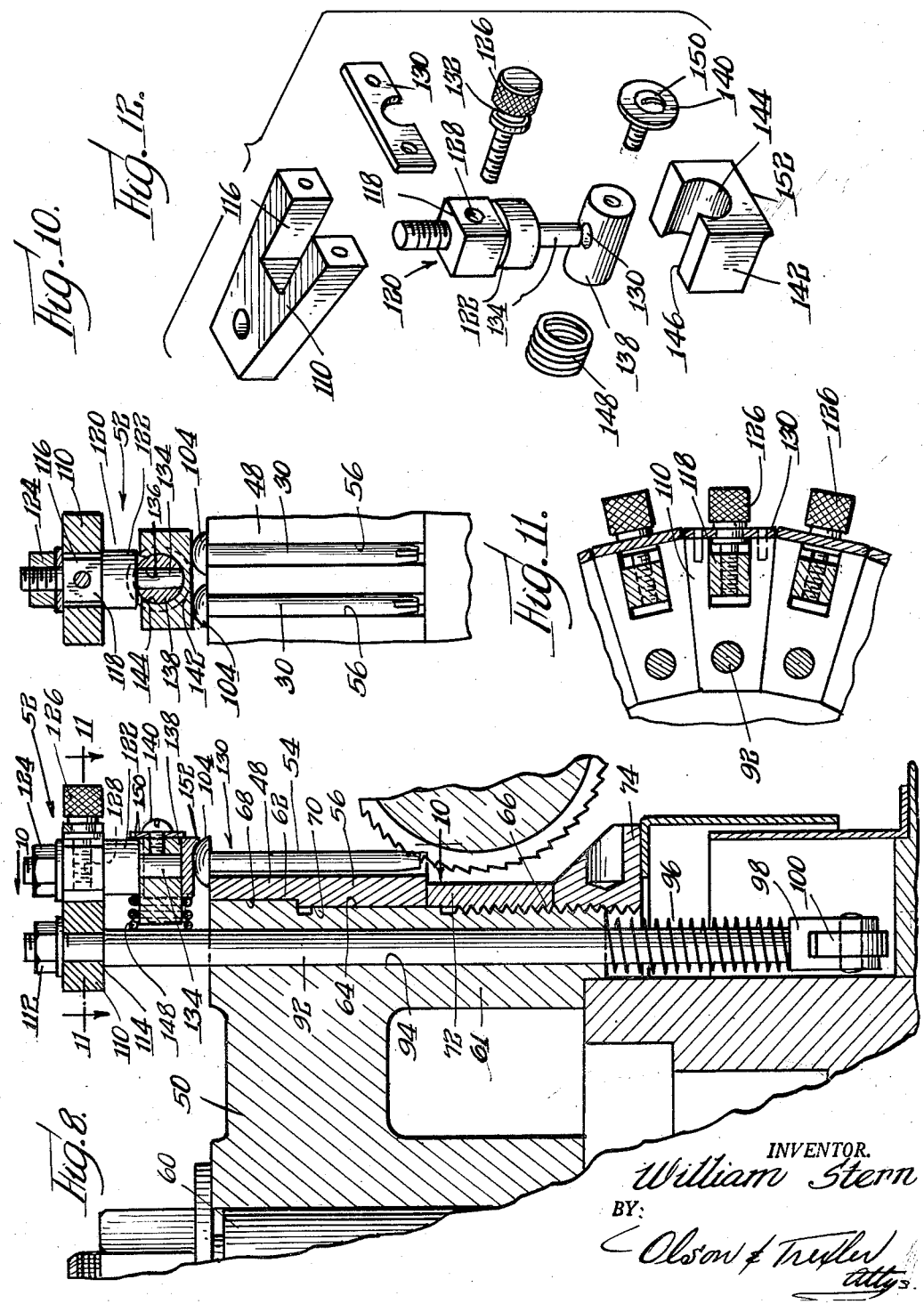

United States Patent Office 3,085,264
Patented Apr. 16, 1963

3,085,264
SCREW SHANK SLOTTING MACHINE WITH CLAMP CARRYING WORK TURRET ROTATABLY MOVABLE PAST A TANGENTIALLY DISPOSED HELICAL SAW
William Stern, Park Ridge, Ill., assignor to Illinois Tool Works Inc., a corporation of Delaware
Filed Sept. 21, 1959, Ser. No. 841,211
4 Claims. (Cl. 10—2)

The present invention relates to machines for slotting the shanks of self-tapping screw blanks, and more particularly to automatic, screw shank slotting machines utilizing a helical saw to cut slots in the shanks of a continuous series of screw blanks.

One object of the invention is to provide for slotting the shanks of self-tapping screw blanks, an automatic slotting machine having a new and improved construction which not only adapts the machine to the slotting of screw blanks of any desired size, but which is inherently well adapted to be set up within a remarkably short time to slot the shanks of screw blanks of any particular size within a virtually unlimited range of screw blank sizes.

Another object is to provide an improved high speed screw blank slotting machine which utilizes a helical saw to generate in the shanks of screw blanks self-tapping slots having a width exceeding the thickness of the saw.

Another object is to provide a screw slotting machine of the above character in which screw blanks are firmly clamped in a holder for machining by the automatic action of clamping heads having a new and improved construction which is readily adjustable to accommodate screw blanks of different sizes.

Another object is to provide an improved screw shank slotting machine as recited which is inherently efficient in its operation and well suited for high speed production.

A further object is to provide an inherently efficient screw shank slotting machine as recited in which screw blanks received from a supply magazine, or the like, are firmly clamped to a rigid support turret element by the powerful clamping action of automatic clamping structure which remains immovable relative to the rigid turret element from the time the screw blanks are clamped upon being received into the machine until they are unclamped for discharge after passing through the slotting or cutting zone in the machine.

Other objects and advantages will be evident from the following description of the exemplary embodiment of the invention illustrated in the drawings, in which:

FIGURE 1 is a partially sectioned elevational view of the improved screw blank slotting machine provided by the invention;

FIG. 2 is a fragmentary top view taken with reference to the inclined line 2—2 of FIG. 1;

FIG. 3 is a fragmentary sectional view taken along the line 3—3 of FIG. 2;

FIG. 4 is a fragmentary sectional view taken along the line 4—4 of FIG. 3;

FIG. 5 is a fragmentary sectional view taken along the line 5—5 of FIG. 2;

FIG. 6 is a sectional view taken along the line 6—6 of FIG. 5;

FIG. 7 is a fragmentary view taken with reference to the line 7—7 of FIG. 4;

FIG. 8 is a fragmentary sectional view taken along the line 8—8 of FIG. 2 and showing the machine set up to slot the shanks of relatively long screw blanks;

FIG. 9 is a view similar to FIG. 8 but showing the machine set up to slot the shanks of shorter screw blanks;

FIG. 10 is a fragmentary sectional view taken along the line 10—10 of FIG. 8;

FIG. 11 is a fragmentary sectional view taken with reference to line 11—11 of FIG. 8;

FIG. 12 is an exploded perspective view of a typical screw blank clamping head;

Figure 13:
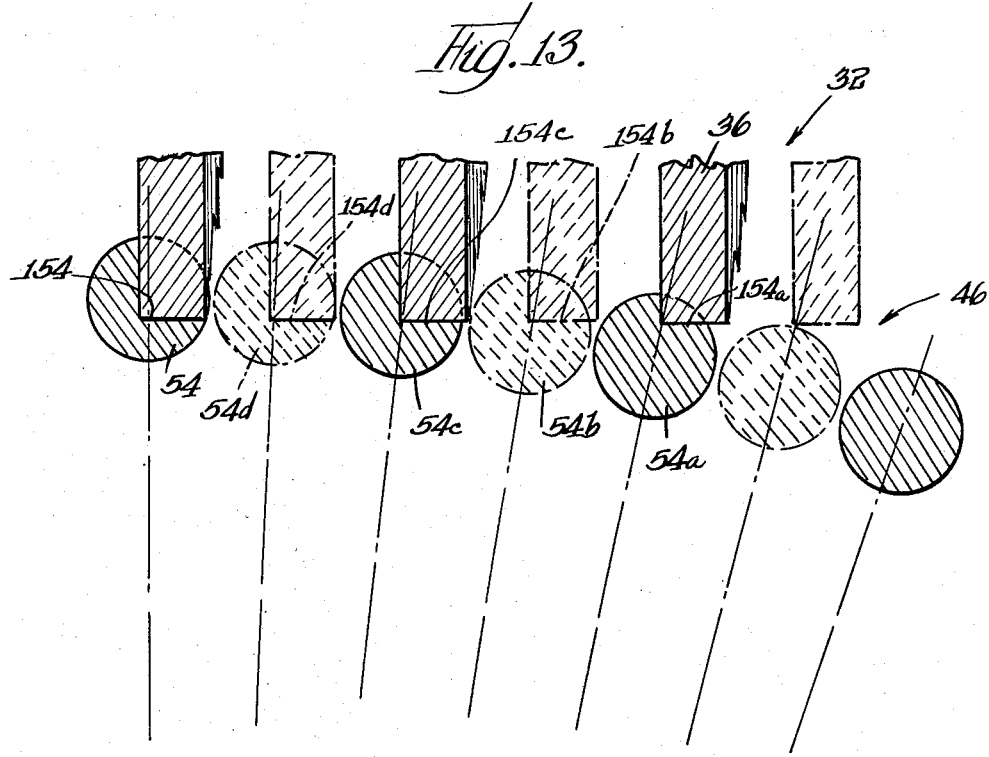
FIG. 13 is a simplified and somewhat schematic view taken with reference to the line 13—13 of FIG. 3 and illustrating on a greatly enlarged scale the progressive cutting action of the helical saw in generating a screw shank slot.

Referring to the drawings in greater detail, the screw slotting machine 20 forming the exemplary embodiment of the invention illustrated comprises a screw slotting unit 22, FIG. 1, mounted in a tipped position on a base 24 to receive screw blanks fed into the slotting unit through a loading chute or magazine 26 from a feeding hopper 28. The hopper 28 is a current commercial form of the screw feeding hopper disclosed in United States Patent No. 2,531,099, issued November 21, 1950 to W. C. Anderson.

Figure 15:
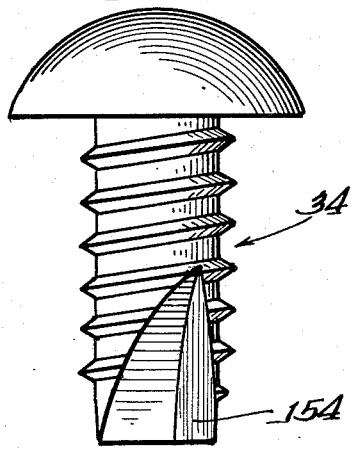
FIG. 15 is an elevational view of a finished self-tapping screw slotted in the machine.

A procession of screw blanks 30, fed down through the chute 26 to the slotting unit 22, as shown in FIGS. 2 and 6, are slotted to form self-tapping screws by the cutting action of a helical saw 32, FIG. 2, incorporated into the slotting unit. A completed self-tapping screw, previously slotted in the machine 20, is illustrated in FIG. 15 and identified generally by the reference number 34.

The construction of the helical saw 32 incorporated into the instant machine 20 is basically similar to that of the helical saw disclosed in applicant's prior Patent No. 2,669,007, issued February 16, 1954. In general, the helical saw 32 comprises a thin, saw blade 36 supported in the form of a helix, on a generally cylindrical arbor 38, FIGS. 2 and 4, which is supported on a rotary shaft 40 journalled in two spaced bearing supports 42, 44. As will presently appear, the helical saw 32 is utilized in the improved machine 20 to cut, in the shanks of self-tapping or thread cutting screw blanks, longitudinally extending slots having widths much wider than the thickness of the helical saw blade 36.

A process of screw blanks 30 supplied through the chute 26 for slotting is moved through a machining zone 46 alongside the saw 32 by means which adapts the machine, as will presently appear, to be set up quickly for slotting screw blanks of any particular size within a virtually unlimited range of sizes. Thus, the procession of screw blanks 30 moving through the slotting unit 22 of the machine are automatically and firmly clamped to a common rigid support 48, FIGS. 3, 5 and 6, in a loading zone 50 adjacent the discharge end of the chute 26, FIGS. 2 and 5, and held tightly clamped to the rigid support by the powerful clamping action of coacting automatic clamping structure 52, FIG. 8, which does not move relative to the rigid support 48 until the screw blanks have passed through the machining or slotting zone 46 and progressed to a discharge zone 54, FIG. 2, where the slotted screw blanks are released from the rigid support to drop down through a guide 55, FIG. 1, into a suitable receiver 57.

The rigid support 48 to which the screw blanks are firmly clamped in the manner recited is formed by an annular ring or turret (also denoted by the number 48) which is designed and dimensioned to receive screw blanks of the size to be slotted in the machine, as shown in FIG. 8. The annular screw support turret 48 has a substantial radial thickness and an axial length which slightly exceeds the length of the shanks 54 of the screw blanks 30 supplied by the hopper 28.

The circumference of the turret 48 is machined to define an annular series of circumferentially spaced axial slots or receivers 56 which open radially outward as shown in FIG. 6 for reception of the shanks of the individual screw blanks. Each turret slot or receiver 56 has a width measured circumferentially with respect to the turret 48 which is just sufficient to accommodate the diameter of the screw shanks 54. The radially inward side of each receiver has the shape of a V-groove in transverse section, as shown in FIG. 6, to assure proper centering of screw shanks fed laterally into the receivers from the chute 26, as will be described presently. The effective radial depth of the receivers 56 is such that the screw shanks 54, upon being fed into the receivers, are flush with the outer periphery of the turret 48.

An annular turret element 48 dimensioned to receive and support screw blanks of the size to be slotted is mounted on a rotary support head 58, FIGS. 2, 3 and 8, supported in the slotted unit 22 by an inclined head shaft 60.

The turret element 48 is rigidly mounted on the rotary head 58 in a manner which provides for quick replacement of the turret with a different turret designed to accommodate screw blanks of a different size.

Thus, as shown, the support head 58 comprises a heavy circular body (also denoted by the number 58) which has a relatively thick skirt portion 61 extending downwardly in concentric relation to the axis of the head. The outer periphery of the head 58 is machined to define, as shown in FIG. 8, an annular shoulder 62 on the upper end of the head which projects a short distance radially beyond an underlying cylindrical support surface 64. The depending head skirt portion 61 is externally threaded below the cylindrical support surface 64 to define threads 66 having a maximum diameter substantially equal to but not greater than the diameter of the support surface 64.

The inner periphery of the turret 48 defines in its upper end, FIG. 8, an annular recess 68 dimensioned to receive and closely interfit with the head shoulder 62. Below the recess 68, the turret 48 defines an internal cylindrical support surface 70 dimensioned diametrically to have a close, sliding fit around the head support surface 64.

The turret 48 is mounted on the head 58 by moving the turret axially into encircling relation to the head from the lower end of the head skirt 60. An annular spacer element 72 having a cylindrical form somewhat thinner than the turret 48 is fitted around the head 50 in immediate underlying relation to the turret 48. The spacer 72 is forced upwardly to firmly seat the turret 48 against the lower edge of the head shoulder 62 by means of an internally threaded nut 74 threaded onto the externally threaded lower end of the head skirt 60. The nut 74 is adapted for rotation by a spanner wrench (not shown).

The turret 48, spacer 72 and nut 74 are mounted on the head 58 while the latter is temporarily removed from its support shaft 60. As shown in FIG. 3, the head shaft 60 is medially journalled axially in antifriction bearings 76, 78. An annular abutment shoulder 80 is formed on the shaft 60 to overlie the upper bearing 76. The head 58 is centrally bored to receive the upper end of the shaft 60 and defines a central depending boss or hub portion 82 designed to engage the shaft shoulder 80 upon mounting of the head on the shaft. The head is retained in its assembled position on the shaft by a nut 84 on the extreme upper end of the shaft which acts against the outer end of the head. Thus, the matter of changing turrets 48 is quite simple. Removal of the nut 84 allows the head 58 to be slipped off of the shaft 60. Removal of the single nut 74 allows the spacer 72 and turret 48 to be slipped off of the lower end of the head. A different turret designed to accommodate screws of a different size is quickly mounted on the head 58 in the manner described and the head readily replaced on the shaft 60.

The turret 48, shown in FIG. 8, is designed to accommodate screw blanks having relatively long shanks 54. The turret 48a substituted in place of the turret 48, as shown in FIG. 9, is much shorter axially than the turret element 48 and is adapted to accommodate screw blanks 30a having much shorter shanks 54a.

The head shaft 60 is rotated by means of a speed reduction gear 86 connected to the lower end of the shaft, as shown in FIG. 2, and driven through gears 88, FIG. 1, from an underlying electric motor 90 on the slotting unit 22. To assure extreme accuracy in the rotary movement of the head 58, it is preferable to use speed reduction gearing 86 which is sold commercially under the trademark "Spiroid." As shown in FIGS. 5 and 6, the turret screw shank receivers 56 moving successively through the screw blank loading zone 50 receive the shanks of a procession of screw blanks 30 which move laterally from the inclined chute 26 into the respective receivers passing by the chute.

As previously mentioned, the screw blanks 30 fed to the turret 48 in the loading zone 50 are immediately clamped firmly to the turret by the automatic action of clamps 52 which are designed to have a substantially universal adjustability which accommodates the clamps to screw blanks of different sizes. Each clamp 52 is designed to clamp against the heads of two adjacent screw blanks 30 supported in the turret 48 as shown in FIG. 10.

The clamps 52 are mounted on the head 58 in an annular array extending around the head as shown in FIGS. 2 and 3. Each clamp comprises an actuating rod 92 slidably mounted in an axial bore 94 formed in the head 58 adjacent its outer periphery. The rod 92 is strongly urged downwardly by a helical compression spring 96 acting between the head skirt 60 and a yoke 98 on the lower end of the rod which carries a cam follower roller 100.

An arcuate clamp actuating cam 102 is mounted in underlying relation to the circular path of the cam follower rollers 100 shown in FIG. 3. The circumferential extent and shape of the cam 102 is such that the rollers 100 and coacting rods 92 are moved upwardly to release the associated screw clamping structure as the clamps 52 reach the screw releasing zone 54, FIG. 2. The rods 92 are held in raised position by the cam 102 until the respective clamps 52 reach the loading zone 50, FIG. 2, where the cam 102 recedes to allow the spring 96 to move the rods 92 downward to effect engagement with the screw blank heads 104, FIGS. 8 and 10, of the clamping structure carried by the upper ends of the rods.

The clamping structure carried by the upper end of each rod is designed to engage the heads 104 of two adjacent screws and is universally adjustable, as previously mentioned, to accommodate screws of a different size.

As shown in FIGS. 8, 10, 11 and 12, each clamp 52 comprises a tapered horizontal support plate 110, the small end of which receives the necked down upper end of the coacting clamp rod 92. A nut 112 on the upper end of the rod 92 holds the plate 110 securely against a shoulder 114 on the rod.

Each mounting plate 110 thus supported on its coacting rod 92 extends radially outward into overlying vertically spaced relation to the turret 48. The projecting end of each plate 110, which is somewhat wider than the inner end of the plate, defines an inwardly extending radial slot 116 which receives a square section 118 of a vertical stem indicated generally by the number 120. A radial enlargement 122 formed on the stem 120 immediately below the square section 118 is normally pushed up tight against the under side of the plate 110 by a nut 124 threaded to the upper end of the stem 120 to press against the top of the plate.

Radial adjustment of the stem 120 with respect to the coacting actuating rod 92 is provided by a knurled adjusting screw 126 threaded into a horizontal bore 128 in the square section 118 of the stem. The screw 126 projects radially outward from the stem 120 beyond the mounting plate 110 and is supported against axial movement relative to the mounting plate by a retaining plate or yoke 130 fixed to the outer end of the mounting plate to engage an annular recess 132 in the screw.

A support tang 134 formed on the lower end of the stem 120 projects downwardly from the stem enlargement 122 into a transverse bore 136 in a horizontal cylindrical support element 138 which extends radially toward the adjacent actuator rod 92, as shown in FIG. 8. The cylindrical element 138 is stabilized with respect to the stem 120 by a set screw 140 extending through the outer end of the cylindrical element into engagement with the stem tang 134.

A screw head engaging element 142 having sufficient width to overlie two screw blank heads 104, as shown in FIG. 10, is slidably supported on the cylindrical element 138 for limited radial movement with respect to the adjacent rod 92. For this purpose the cylindrical support element 138 is slidably disposed within a cylindrical bore 144 formed in the upper side of the engaging element 142. An axial slot 146 in the upper end of the cylindrical bore 144, FIG. 12, has a width less than the diameter of the bore 144 and provides clearance for movement of the engaging element 142 relative to the upwardly extending stem 120.

The screw engaging element 142 is yieldably urged radially outward to a normal position with respect to the coacting stem 120 by means of a helical compression spring 148 disposed between the adjacent rod 92 and the radially inward end of the engaging element, as shown in FIG. 8. Outward movement of the engaging element 142 is terminated by its engagement with a washer 150 fixed to the outer end of the cylindrical element 138 by the previously mentioned set screw 140.

A downwardly turned lip 152 on the outer end of the engaging element 142 exerts a radial retaining action on the underlying screw head 154, as shown in FIG. 8.

The ability of each screw engaging element 142 to rotate horizontally about the cylindrical element 138 causes the engaging element to exert equal clamping forces on the heads 104 of two underlying screw blanks 30 even though the heads may be of different thickness. In the event that only one of the underlying receivers 56 is supplied with a screw blank, the engaging element 142 will pivot to properly clamp the single underlying screw blank. In the event that chips or other foreign matter should become wedged between the radially outward end of the clamping element 142 and the adjacent machine structure, the element 142 will move inwardly against the spring 148 to prevent jamming.

Screw blanks 30 supplied to the turret 48 at the loading zone 50 are firmly clamped to the turret by the overlying clamping elements 142 which are moved downwardly by the springs 96 as the clamping control 102 recedes in the manner described.

Thus, firmly supported in the turret 48 the screw blanks are carried in an arcuate path through the machining zone 46 where the screw shanks 54 move into engagement with the helical saw blade 36 to effect a progressive cutting of a slot 154 in each individual screw shank 154, as illustrated in FIG. 13 which depicts a sequence of positions of an individual screw shank relative to the saw blade 36 as the shank progresses through the slotting zone 46. The helical saw 32 is properly positioned in relation to the arcuate path of the screw shanks 54 and driven in properly timed relation to movement of the screw shanks by means to be described presently.

Figure 14:
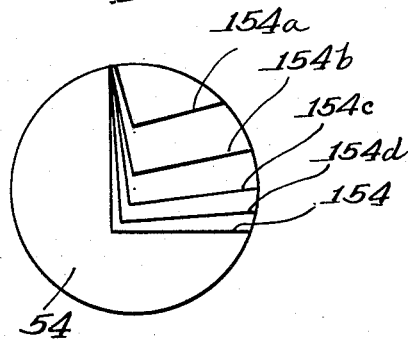
FIG. 14 is an enlarged cross-sectional view of a screw blank shank illustrating the progression of the slotting action of the saw relative to the screw shank.

It is particularly noteworthy that the operative relationship of the helical saw 32 relative to the arcuate path of the screw blank shanks 54 through the machining zone 46 enables the helical saw blade 36 to generate a slot 154 in the screw shank which is wider than the thickness of the saw blade. This slot generating action is illustrated in FIGS. 13 and 14. As shown in FIG. 13, the saw blade 36 is in effective cutting engagement with three successive screw blanks 54a, 54c and 54 shown in solid lines in this figure. The phantom illustration of the screw shanks 54b and 54d are added to illustrate the progression of the slotting action in the intervening positions along the arcuate path of the shanks between the instantaneous position of the shanks 54a, 54c and 54 illustrated in solid lines. Progressive stages in the formation of a slot 154 in a screw shank 54 are identified in FIGS. 13 and 14 by the reference numbers 154a, 154b, 154c, 154d and 154.

The ability of the machine 20 to generate a screw shank slot wider than the thickness of the helical saw blade 36 is of advantage in producing screws having rather wide shank slots required in certain types of self-threading screws.

Further with reference to the adaptability of the machine to be quickly set up to slot screw blanks of any particular size, adjustment of the clamps 52 to accommodate screws of different diameter and the mounting in the machine of a turret element 48 designed to receive the screw blanks of the particular size to be machined have been previously described in detail.

In conjunction with these adaptations of the machine to receive screw blanks of different sizes, provision is made for three-way adjustment of the helical saw 32 in the machining zone 46 to properly engage the shanks of screw blanks of different size while at the same time providing a synchronized drive to the saw which maintains proper synchronization of the saw with the head 58 for all positions of the saw.

Thus, as shown in FIG. 2, the bearing supports 42, 44 for a saw are mounted on a slide 156 which is supported on a slide 158, FIGS. 2 and 3, for vertical adjustment relative to the slide 158 by a hand wheel 160. The slide 158 in turn is supported on a slide 162 for adjustment in a horizontal direction radially toward and away from the axis of the head 58 by a hand wheel 164. The slide 162 is supported on ways 166 for horizontal adjustment in a direction generally parallel to the axis of the saw 32 by a hand wheel 168, FIG. 2. The hand wheels 160, 164 and 168 are provided with suitable graduated scales or the like for use in making the necessary three-way adjustments in the position of the saw.

Synchronized rotation of the saw 32 in all positions of the saw is provided by a gear drive 170, FIG. 1, powered through the gear train 88 and illustrated in greater detail in FIGS. 4 and 7. Thus, as shown in FIG. 4, the gear train 88 rotates a shaft 172 journalled in a stationary support 174 for driving the previously mentioned "Spiroid" gearing 86. A gear support arm 176 is swingably mounted on a boss 178 on the support 174 for angular adjustment about the axis of the shaft 172. The arm 176 is clamped in various positions of adjustment by tightening of a headed screw 178 against a lateral wing 180 on the arm which defines an arcuate slot 182 receiving the screw.

A gear 184 nonrotatably mounted on the shaft 172, FIG. 4, engages an idler gear 186 rotatably mounted on an axle 188 supported on the arm 176 for adjustment along a longitudinal slot 190 in the arm. The idler 186 meshes with a second idler 192 carried by an axle 194 adjustably mounted in the outer end of the arm slot 190.

The idler 192 meshes with an axially elongated gear 196 secured to one end of the saw support and drive shaft 40. The gear 196 has sufficient axial length to maintain its engagement with the gear 192 for all positions of longitudinal adjustment of the saw effected by operation of the hand wheel 168. Angular adjustment of the arm 176 and its supported gears 176 and 192 about the axis of the shaft 172 provides for proper engagement of the gear 192 with gear 196 for all vertical and radial positions of adjustment of the saw 32 effected by operation of the hand wheels 160 and 164.

It will be appreciated that the invention is not necessarily limited to the specific embodiment illustrated but includes variants and alternatives within the spirit and scope of the invention as defined by the claims.

The present invention is claimed as follows:

1. In a machine for slotting the shanks of screw blanks of different sizes, the combination of a rigid turret defining in the periphery thereof a circumferential series of axial slots opening radially outward, rotary support means, means detachably mounting said turret on said support means for rotation thereby, a circumferential series of clamps carried by said support means for rotation therewith in alinement with said slots; each clamp including an axially movable actuating element, spring means for urging said actuating elment in a clamping direction, a clamping head, and means supporting said clamping head on said actuating element in coacting relation to a pair of said slots; said supporting means for each clamping head including means for effecting adjustments of the position of said clamping head radially with respect to the rotary axis of said rotary support means to properly position said clamping head for engagement with screw blanks of different sizes, means for operating said clamp actuating elements in timed relation to rotation of said rotary support comprising cam means located axially below said turret for engagement by said axially movable actuating element, means enclosing said cam means, and a helical saw having a plurality of convolutions and being supported in a slotting position adjacent and generally tangent to the circular path through which said slots are moved upon rotation of said rotary support means.

2. In a machine for slotting the shanks of blanks of self-threading screws, the combination of a rotary support, a circular screw blank supporting turret, means for removably mounting said turret on said support for rotation therewith, said turret having a circular periphery defining a circumferentially spaced series of axial slots opening radially outward, said turret being shaped at one end of said slots to support the heads of screw blanks in said slots, a circumferentially spaced series of clamping actuators mounted on said support for rotation therewith and for axial movement with respect thereto enclosed cam means located below said turret for engagement by said clamping actuators, compression springs coacting with said actuators to urge the latter in a clamping direction toward said screw blank supporting end of said turret and simultaneously into engagement with said enclosed cam means, a clamp support mounted on each of said actuating elements and extending radially outward in alinement with two of said slots, a clamping head supported on each of said clamp supports in opposing relation to the adjacent ends of the two coacting slots, means for adjusting each of said clamping heads relative to the coacting clamp actuating element to adjust the position of the clamping head radially with respect to the axis of said turret, a helical saw comprising a plurality of helical convolution and being mounted along side the rotary path of said slots in generally tangential spaced relation to said path, driving means connected to said rotary support and said saw for rotating the two in timed relation to each other, and cam means coacting with said clamp actuating elements to effect operation thereof in timed relation to rotation of said support.

3. In a machine for slotting the shanks of screw blanks of different sizes, the combination of a rotary head, a one-piece rigid annular turret disposed in encircling relation to said head and defining a circular series of circumferentially spaced screw blank receivers opening radially outward, a plurality of screw blank clamps carried by said head for rotation therewith and extending radially outward into overlapping relation to an adjacent axial end of said turret to clamp screw blanks in corresponding receivers in said turret, said turret defining a locating abutment thereon, said head defining a locating abutment thereon coacting with said abutment on said turret to limit axial movement of said turret toward said clamps, retaining means coacting with said turret to releasably hold the latter in a mounted position on said head with said abutment on the turret in engagement with said locating abutment on said head whereby said turret can be released for removal from said head by movement of the turret away from the clamp end of the head, means for supplying a procession of screw blanks to said receivers upon rotation of said head and turret, means for operating said clamps in timed relation to rotation of said head to clamp screw blanks in said receivers for movement individually through an arc of a circular path, a helical saw comprising a plurality of helical saw convolutions and being positioned in a generally tangential relation to said turret in interfering relation to said circular path of movement of screw blanks carried in said receivers to effect slotting of screw blanks moved into engagement with the saw along an arc of a circular path of movement of the screw blanks.

4. In a machine for slotting the shanks of screw blanks of different sizes, the combination of a rotary spindle extending in a generally upward direction, a head removably secured to said spindle for rotation therewith, an annular turret removably disposed in concentric relation to said head and defining a series of circular spaced screw blank receivers opening radially outward, a plurality of screw blank clamps carried by said head for rotation therewith and extending radially outward in overlying relation to said turret for coaction with corresponding receivers in said turret, said turret defining a locating abutment thereon, said head defining a locating abutment coacting with said locating abutment on said turret to limit axial movement of said turret toward the clamp end of said head, releasable turret retaining means supported on said head and coacting with said turret to hold said locating abutment thereon in engagement with said locating abutment on said head releasably to fix said turret on said head, said retaining means being releasable to provide for removal of said turret from said head by axial movement of the turret along the head away from the clamp end of the head after the head has been removed from said spindle, screw blank supply means positioned to supply a procession of screw blanks to successive receivers in said turret upon rotation of said head, means coacting with said clamps to operate the latter in timed relation to rotation of said head to clamp screw blanks in said receivers for movement through an arc of a circular path, a helical saw comprising a plurality of helical convolutions and being supported in generally tangential relation to said turret with helical convolutions of the saw disposed in interfering relation to said circular screw blank path so that the screw blanks are progressively advanced radially into the saw to be slotted thereby while moving along the length of the saw.

References Cited in the file of this patent

UNITED STATES PATENTS

| | | |
|---|---|---|
| 1,021,242 | Fishburne | Mar. 26, 1912 |
| 1,762,192 | Peirce | June 10, 1930 |
| 2,540,058 | Stern | Jan. 30, 1951 |
| 2,657,402 | Poupitch | Nov. 3, 1953 |
| 2,718,820 | Faselt | Sept. 27, 1955 |
| 2,820,973 | Farmer | Jan. 28, 1958 |
| 2,987,313 | Bjering | June 6, 1961 |

FOREIGN PATENTS

| | | |
|---|---|---|
| 639,466 | Great Britain | June 28, 1950 |